(12) United States Patent
Höjer

(10) Patent No.: US 10,816,244 B2
(45) Date of Patent: Oct. 27, 2020

(54) COMPRESSOR CHILLER SYSTEMS INCLUDING THERMOELECTRIC MODULES, AND CORRESPONDING CONTROL METHODS

(71) Applicant: Laird Technologies, Inc., Chesterfield, MO (US)

(72) Inventor: Henrik Höjer, Kungälv (SE)

(73) Assignee: Laird Thermal Systems, Inc., Morrisville, NC (US)

( * ) Notice: Subject to any disclaimer, the term of this patent is extended or adjusted under 35 U.S.C. 154(b) by 97 days.

(21) Appl. No.: 16/020,352

(22) Filed: Jun. 27, 2018

(65) Prior Publication Data

US 2019/0271489 A1     Sep. 5, 2019

Related U.S. Application Data

(60) Provisional application No. 62/637,070, filed on Mar. 1, 2018.

(51) Int. Cl.
    *F25B 21/02*     (2006.01)
    *F25B 25/00*     (2006.01)
    (Continued)

(52) U.S. Cl.
    CPC ............... *F25B 21/02* (2013.01); *F25B 1/04* (2013.01); *F25B 5/04* (2013.01); *F25B 6/04* (2013.01);
    (Continued)

(58) Field of Classification Search
    CPC ....... F25B 21/02; F25B 25/005; F25B 49/022
    See application file for complete search history.

(56) References Cited

U.S. PATENT DOCUMENTS 5,491,982 A * 2/1996 Gowens ................. F25B 17/02
                                                    62/434
8,844,308 B2    9/2014 Martin et al.
(Continued)

OTHER PUBLICATIONS

Partial European Search Report for EP application No. EP19160100 which claims priority to the instant application, dated Jul. 22, 2019, 15 pages.

(Continued)

*Primary Examiner* — Elizabeth J Martin
*Assistant Examiner* — Nael N Babaa
(74) *Attorney, Agent, or Firm* — Harness, Dickey & Pierce, P.L.C.; Anthony G. Fussner

(57) ABSTRACT

According to various aspects, exemplary embodiments are disclosed of chiller systems including thermoelectric modules, and corresponding control methods. In an exemplary embodiment, a compressor chiller system generally includes a refrigerant loop having a refrigerant fluid, a compressor connected in the refrigerant loop to compress the refrigerant fluid, and a condenser connected in the refrigerant loop to receive the compressed refrigerant fluid from the compressor and to condense the compressed refrigerant fluid. The system also includes a heat transfer component connected in the refrigerant loop to receive the condensed refrigerant fluid from the condenser, and a coolant loop having a coolant fluid. The heat transfer component is connected in the coolant loop to transfer heat from the coolant fluid to the condensed refrigerant fluid. The system further includes a thermoelectric module connected in the coolant loop. The thermoelectric module is adapted to transfer heat into and/or out of the coolant fluid.

20 Claims, 3 Drawing Sheets

(51) Int. Cl.
*F25B 39/00* (2006.01)
*F25D 3/00* (2006.01)
*F25D 17/02* (2006.01)
*F25D 23/00* (2006.01)
*F25B 5/04* (2006.01)
*F25B 49/02* (2006.01)
*F25B 21/04* (2006.01)
*F25B 1/04* (2006.01)
*F25B 6/04* (2006.01)
*F25B 40/02* (2006.01)
*F25B 43/00* (2006.01)

(52) U.S. Cl.
CPC ............. *F25B 21/04* (2013.01); *F25B 25/00* (2013.01); *F25B 25/005* (2013.01); *F25B 39/00* (2013.01); *F25B 40/02* (2013.01); *F25B 43/006* (2013.01); *F25B 49/022* (2013.01); *F25D 3/005* (2013.01); *F25D 17/02* (2013.01); *F25D 23/003* (2013.01); *F25B 2313/008* (2013.01); *F25B 2321/021* (2013.01); *F25B 2321/0251* (2013.01); *F25B 2321/0252* (2013.01); *F25B 2600/0251* (2013.01); *F25B 2600/0253* (2013.01); *F25B 2700/21161* (2013.01)

(56) References Cited

U.S. PATENT DOCUMENTS

| | | |
|---|---|---|
| 2003/0188538 A1 | 10/2003 | Chu et al. |
| 2008/0105404 A1* | 5/2008 | Luo ...................... F25B 23/006 165/104.21 |
| 2008/0156032 A1 | 7/2008 | Cur et al. |
| 2012/0048467 A1 | 3/2012 | Mahadeswaraswamy et al. |
| 2012/0205088 A1* | 8/2012 | Morisita ............ B60H 1/00921 165/202 |
| 2014/0165596 A1 | 6/2014 | Freese et al. |
| 2017/0138663 A1* | 5/2017 | Wells ...................... F25B 21/02 |
| 2018/0031327 A1* | 2/2018 | Chou ...................... F28D 20/00 |

OTHER PUBLICATIONS

Secondary loop and heat pump climate control under evaluation once more; SAE International, http://articles.sae.org/14495/, Dec. 9, 2015, 19 pages.

* cited by examiner

COMPRESSOR CHILLER SYSTEMS INCLUDING THERMOELECTRIC MODULES, AND CORRESPONDING CONTROL METHODS

CROSS-REFERENCE TO RELATED APPLICATION

This application claims the benefit and priority of U.S. Provisional Application No. 62/637,070 filed Mar. 1, 2018. The entire disclosure of the above application is incorporated herein by reference.

FIELD

The present disclosure generally relates to systems and methods of operating compressor chiller systems including thermoelectric modules, and corresponding control methods.

BACKGROUND

This section provides background information related to the present disclosure which is not necessarily prior art.

Chiller systems commonly use compressors to provide cooling operation, but it is often difficult to achieve a tight system stability when the compressors are controlled in an on and off mode. In some cases, an electrical heater is added in a coolant loop to provide improved temperature control by applying both cooling from the compressor and heating from the electrical heater at the same time. But this approach tend to be rather inefficient.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
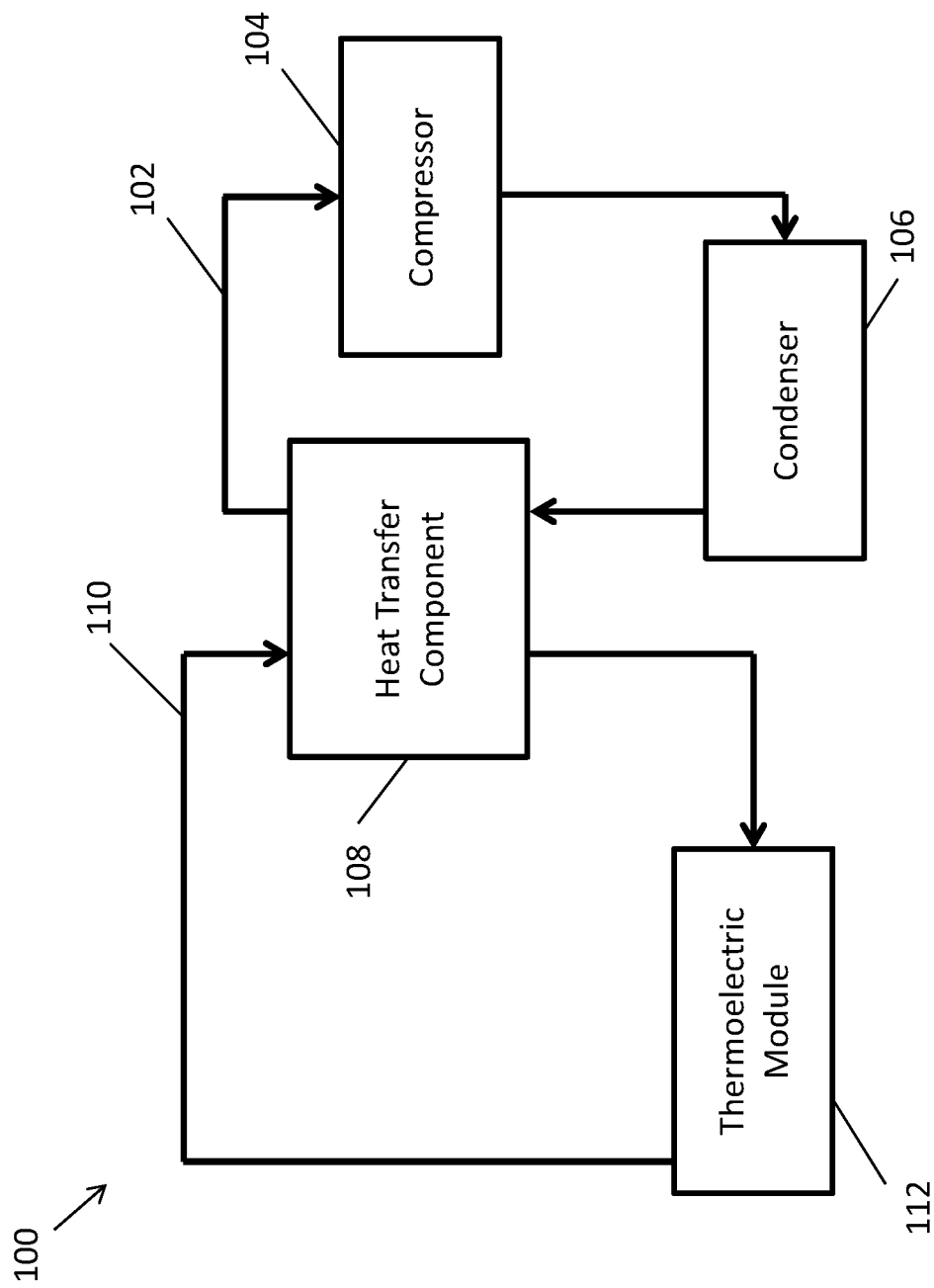
FIG. 1 is a block diagram of a compressor chiller system having a thermoelectric module according to an exemplary embodiment of the present disclosure.

Example embodiments will now be described more fully with reference to the accompanying drawings.

As recognized herein, chiller systems commonly use compressors to provide cooling operation, but it is often difficult to achieve a tight system stability when the compressors are controlled in an on and off mode. In some cases, an electrical heater is added in a coolant loop to provide improved temperature control by applying both cooling from the compressor and heating from the electrical heater at the same time. However, this approach is rather inefficient.

For example, an alternating current (AC) voltage compressor usually cannot be turned on or off as often as desired to maintain a stable chiller system temperature. The compressor should be running for a certain amount of time (e.g., multiple minutes, etc.) before the compressor is turned off, and the compressor should be off for a certain amount of time (e.g., multiple minutes, etc.) before the compressor is turned on again. This is due to cooling of the compressor motor and lubrication of the compressor mechanics.

Sometimes, a frequency control is used to vary the speed of the compressor, or a direct current (DC) voltage compressor is used with speed control. Adding a resistive electrical heater enables running the compressor continuously, by compensating for the overcapacity the compressor provides through added heat (e.g., increasing the thermal load). The compressor keeps cooling continuously and the resistive electrical heater adjusts the temperature by adding more or less heat.

Also recognized herein is that the chiller system could be improved by replacing the resistive electrical heater with a thermoelectric module. This would increase heating efficiency and enable more accurate coolant fluid temperature control by applying cooling from the thermoelectric module when applicable.

For example, the thermoelectric module can increase stability of the chiller system, change a set point of the chiller system faster, change the temperature of the chiller system with increased control, etc. Cool down time could also be reduced for certain applications.

The thermoelectric module could be any suitable module, such as a liquid-to-air thermoelectric heat pump. In that case, liquid (e.g., coolant fluid) is temperature controlled by the thermoelectric module and energy (e.g., heat) is dissipated to ambient air. Additionally, or alternatively, a thermoelectric module could control the temperature of air or a solid plate/component, and heat could be dissipated to a liquid circuit, another solid plate, etc.

In some embodiments, a compressor maximum capacity can be designed at less than a maximum cooling demand of the system, and the thermoelectric module can provide extra cooling capacity when necessary (e.g., at worst case operating points, etc.). This approach could allow for a cheaper compressor system, and could allow for a higher on time of the compressor to extend an expected life of the compressor.

Specifically, continuous operation of a compressor increases the expected life of the compressor, because stopping and starting a compressor more often increases wear on components of the compressor. If a compressor is designed with a maximum capacity that is less than a maximum cooling demand of the chiller system, the compressor will need to be on for a longer time period, which will extend the expected life of the compressor. In this case, the thermoelectric module can add the last portion of cooling capacity when needed. In contrast, if the compressor maximum capacity is matched to the maximum cooling demand of the chiller system, the compressor will be turned on and off more often.

An example application includes a chiller system where the coolant fluid (e.g., water glycol, etc.) maintains a stable low temperature for carbon dioxide ($CO_2$) pump heads. Higher temperatures would make the $CO_2$ boil. Using a compressor and refrigerant loop to remove a bulk of the heat from the coolant fluid and using a thermoelectric module to add extra capacity as necessary, improves system efficiency and stability of a temperature set point of the coolant fluid.

Disclosed herein are exemplary embodiments of compressor chiller systems. In an exemplary embodiment, a compressor chiller system generally includes a refrigerant loop having a refrigerant fluid, a compressor connected in the refrigerant loop to compress the refrigerant fluid, and a condenser connected in the refrigerant loop to receive the compressed refrigerant fluid from the compressor and to condense the compressed refrigerant fluid.

The system also includes a heat transfer component connected in the refrigerant loop to receive the condensed refrigerant fluid from the condenser, and a coolant loop having a coolant fluid. The heat transfer component is connected in the coolant loop to transfer heat from the coolant fluid to the condensed refrigerant fluid.

The system further includes a thermoelectric module. The thermoelectric module may be connected in the coolant loop and adapted to transfer heat into and/or out of the coolant fluid. Alternatively, or in addition, a thermoelectric module may be connected in the refrigerant loop and adapted to transfer heat into/out of the refrigerant fluid.

In some embodiments, a temperature sensor is coupled to the coolant loop and adapted to sense a temperature of the coolant fluid, and a controller is coupled between the temperature sensor and the thermoelectric module. The controller is configured to receive a sensed coolant fluid temperature form the temperature sensor, and to control the thermoelectric module based on the received coolant fluid temperature.

The compressor may be adapted to run substantially continuously. In that case, the controller can be configured to control the thermoelectric module to maintain the coolant fluid temperature substantially at a set point temperature. For example, a maximum cooling capacity of the compressor may be less than a maximum cooling demand of the system, and the controller may be configured to control the thermoelectric module to provide additional cooling capacity when the cooling demand of the system exceeds the maximum cooling capacity of the compressor.

In some embodiments, the thermoelectric module is a liquid-to-air thermoelectric module, and a heat sink is coupled to the thermoelectric module. In that case, the chiller system may include a fan adapted to generate an air flow through the condenser and through the heat sink coupled to the thermoelectric module.

The heat transfer component may comprise at least one of a heat exchanger and an evaporator. The system can include a pump connected in the coolant loop and adapted to generate a cooling liquid flow through the coolant loop. Also, the system can include a thermal load component connected in the coolant loop, the thermal load component adapted to transfer heat from the thermal load component to the coolant fluid in the coolant loop to cool the thermal load component.

Example embodiments disclosed herein may provide one or more (or none) of the following advantages: increased system operational efficiency, increased heating efficiency when applicable, increased temperature stability and accuracy, reduced size and cost of a compressor, reduced cool down time for some applications, etc.

With reference to the figures, FIG. 1 illustrates an example compressor chiller system 100 according to some aspects of the present disclosure. The compressor chiller system 100 includes a refrigerant loop 102 having a refrigerant fluid, and a compressor 104 connected in the refrigerant loop 102 to compress the refrigerant fluid.

A condenser 106 is connected in the refrigerant loop 102. The condenser 106 receives the compressed refrigerant fluid from the compressor 104, and condenses the compressed refrigerant fluid. A heat transfer component 108 is also connected in the refrigerant loop 102 to receive the condensed refrigerant fluid from the condenser 106.

The compressor chiller system 100 further includes a coolant loop 110 having a coolant fluid. The heat transfer component 108 is connected in the coolant loop 110 to transfer heat from the coolant fluid in the coolant loop 110 to the condensed refrigerant fluid in the refrigerant loop 102.

A thermoelectric module (TEM) 112 is also connected in the coolant loop 110. The thermoelectric module 112 is adapted to transfer heat into and/or out of the coolant fluid in the coolant loop 110. For example, the thermoelectric module 112 can control a temperature of the coolant fluid in the coolant loop 110 by transferring heat into the coolant fluid to increase the temperature of the coolant fluid, and by transferring heat out of the coolant fluid to decrease the temperature of the coolant fluid (e.g., to provide extra cooling capacity in addition to the compressor 104, etc.).

In some cases, the compressor 104 is adapted to run substantially continuously, and the thermoelectric module 112 maintains the coolant fluid temperature substantially at a set point temperature. Therefore, the thermoelectric module 112 may extend the life of the compressor 104 (e.g., by reducing the number of required compressor turn on and turn off events), the thermoelectric module 112 may provide faster and more accurate set point temperature control of the coolant fluid temperature, etc.

The compressor 104 may have a maximum cooling capacity that is less that a maximum cooling demand of the compressor chiller system 100, and the thermoelectric module 112 can provide additional cooling capacity when the cooling demand of the compressor chiller system 100 exceeds the maximum cooling capacity of the compressor 104. Therefore, use of the thermoelectric module 112 can reduce the size (and cost) of the compressor 104 that is required for the compressor chiller system 100.

The heat transfer component 108 may be any suitable component capable of transferring heat between the refrigerant loop 102 and the coolant loop 110. For example, the heat transfer component 108 may transfer heat from the coolant loop 110 to the refrigerant loop 102 to reduce a temperature of the coolant fluid in the coolant loop 110. Example heat transfer components can include a heat exchanger, an evaporator, etc.

Figure 2:
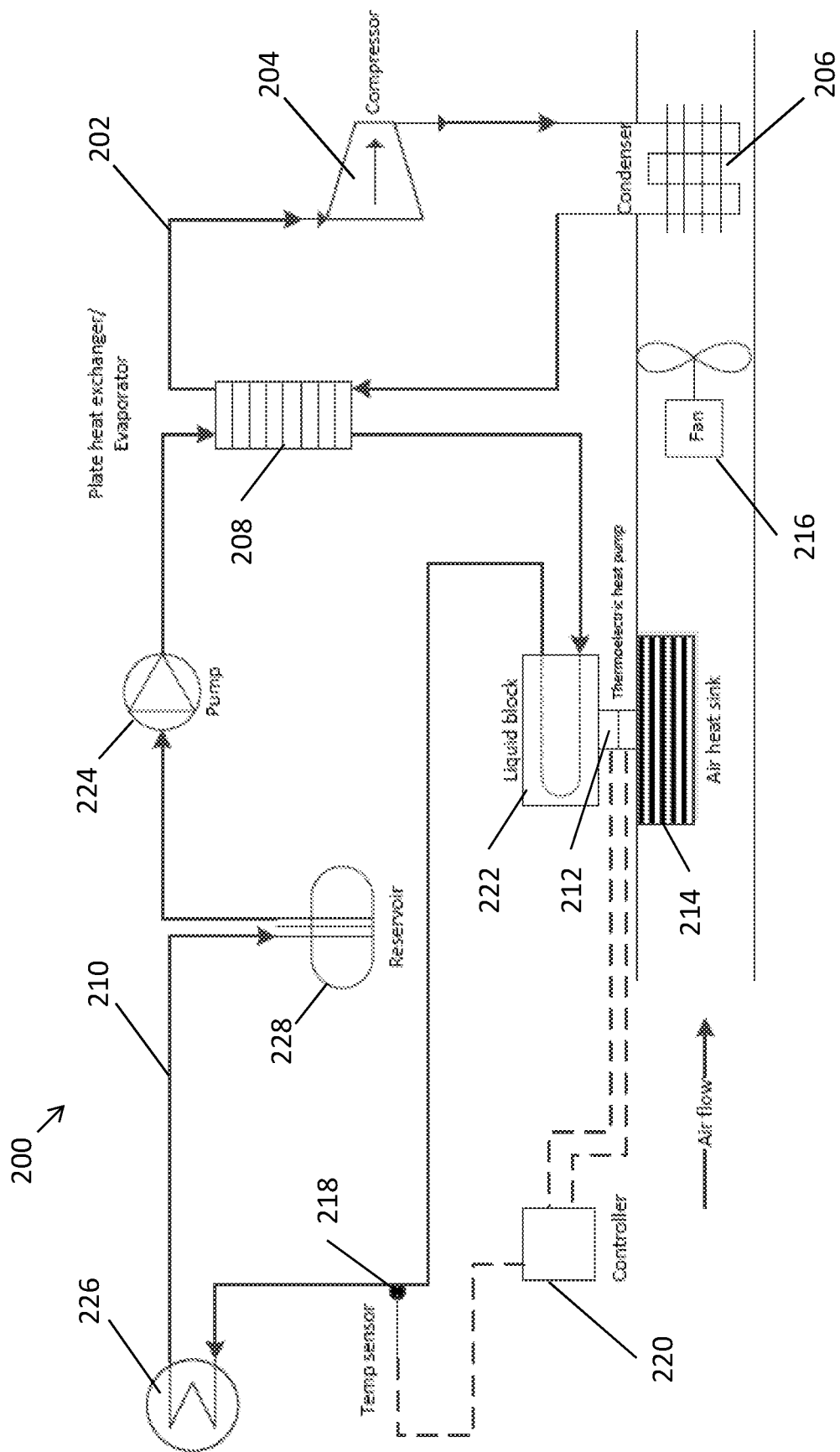
FIG. 2 is a block diagram of a compressor chiller system including a heat sink and a fan according to another exemplary embodiment of the present disclosure.

FIG. 2 illustrates a compressor chiller system 200 according to another example embodiment of the present disclosure. The compressor chiller system 200 includes a refrigerant loop 202 having a refrigerant fluid, and a compressor 204 connected in the refrigerant loop 202 to compress the refrigerant fluid.

A condenser 206 is connected in the refrigerant loop 202 and receives the compressed refrigerant fluid from the compressor 104 to condense the compressed refrigerant fluid. A heat transfer component 208 is also connected in the refrigerant loop 202 to receive the condensed refrigerant fluid from the condenser 206.

The compressor chiller system 200 further includes a coolant loop 210 having a coolant fluid. The heat transfer component 208 is connected in the coolant loop 210 to transfer heat from the coolant fluid in the coolant loop 210 to the condensed refrigerant fluid in the refrigerant loop 202.

A thermoelectric module 212 is also connected in the coolant loop 210, and is adapted to transfer heat into and/or out of the coolant fluid in the coolant loop 210. For example, the thermoelectric module 212 can control a temperature of the coolant fluid in the coolant loop 210 by transferring heat into the coolant fluid to increase the temperature of the coolant fluid, and by transferring heat out of the coolant fluid to decrease the temperature of the coolant fluid (e.g., to provide extra cooling capacity in addition to the compressor 204, etc.).

The thermoelectric module 212 may be any suitable module, including a thermoelectric module assembly (TEA). For example, the thermoelectric module 212 may be a liquid-to-air TEM that transfers heat between the coolant fluid and ambient air. Other embodiments could include liquid-to-solid surface TEMs, liquid-to-liquid circuit TEMs, etc. In some cases, the thermoelectric module 212 may be considered as a thermoelectric heat pump.

The refrigerant loop 202 and coolant loop 210 may each include a closed fluid flow path for the respective refrigerant fluid and coolant fluid. For example, tubes, channels, etc. may direct the refrigerant fluid between components of the refrigerant loop 202, may direct the coolant fluid between components of the coolant loop 210, etc.

As shown in FIG. 2, a heat sink 214 is coupled to the thermoelectric module 212. The heat sink 214 provides a thermal interface with the thermoelectric module 212 to enhance transfer of heat by the thermoelectric module 212 between the coolant fluid and ambient air. The heat sink 214 may include any suitable heat sink construction, including one or more fins, one or more heat pipes, etc.

The compressor chiller system 200 includes a fan 216 that directs air flow across the heat sink 214 and the condenser 206. The air flow generated by the fan 216 can increase the transfer of heat from the heat sink 214 to ambient air, and can increase the transfer of heat from the condenser 206 to ambient air. The fan 216 may be disposed in a same channel, vent, passageway, etc. as the heat sink 214 and the condenser 206.

A temperature sensor 218 is coupled to the coolant loop 210, and is adapted to sense a temperature of the coolant fluid in the coolant loop 210. A controller 220 is coupled between the temperature sensor 218 and the thermoelectric module 212. The controller 220 receives a sensed coolant fluid temperature from the temperature sensor 218, and controls the thermoelectric module 212 based on the received coolant fluid temperature.

Therefore, the temperature sensor 218 and the controller 220 can operate the thermoelectric module 212 to maintain a temperature of the coolant fluid in the coolant loop 210 at a set point temperature. For example, the controller 220 may control the thermoelectric module 212 to transfer heat into the coolant fluid (e.g., via a liquid block 222, etc.) when the coolant fluid temperature is below the set point temperature, and the controller 220 may control the thermoelectric module 212 to transfer heat out of the coolant fluid when the coolant fluid temperature is above the set point temperature.

As shown in FIG. 2, the compressor chiller system 200 also includes a pump 224, a thermal load component 226, and a coolant fluid reservoir 228. The pump 224 is connected in the coolant loop 210 and is adapted to generate a coolant fluid flow in the coolant loop 210.

The thermal load component 226 is connected in the coolant loop 210 to transfer heat from the thermal load component 226 to the coolant fluid. The coolant fluid reservoir 228 stores coolant fluid as the coolant fluid is cycling through the coolant loop 210. Therefore, the pump 224 and coolant fluid reservoir 228 facilitate cooling of the thermal load component 226.

Figure 3:
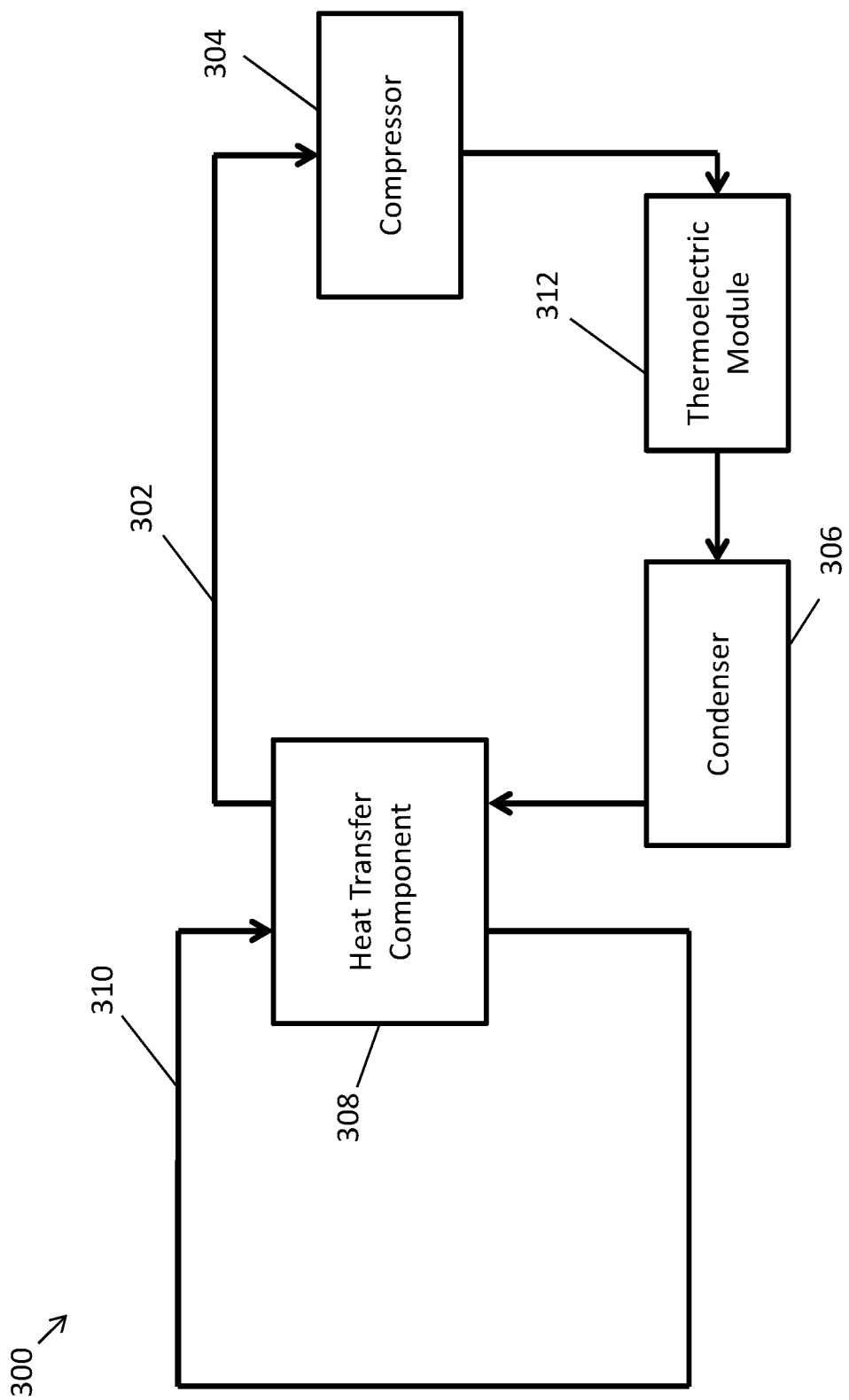
FIG. 3 is a block diagram of a compressor chiller system having a thermoelectric module in a refrigerant loop, according to another exemplary embodiment of the present disclosure.

FIG. 3 illustrates a compressor chiller system 300 according to another example embodiment of the present disclosure. The compressor chiller system 300 includes a refrigerant loop 302 having a refrigerant fluid, and a compressor 304 connected in the refrigerant loop 302 to compress the refrigerant fluid.

A condenser 306 is connected in the refrigerant loop 302 and receives the compressed refrigerant fluid from the compressor 304 to condense the compressed refrigerant fluid. A heat transfer component 308 is also connected in the refrigerant loop 302 to receive the condensed refrigerant fluid from the condenser 306.

The compressor chiller system 300 further includes a coolant loop 310 having a coolant fluid. The heat transfer component 308 is connected in the coolant loop 310 to transfer heat from the coolant fluid in the coolant loop 310 to the condensed refrigerant fluid in the refrigerant loop 302.

In contrast to the thermoelectric module 212 in the compressor chiller system 200 illustrated in FIG. 2, the thermoelectric module 312 of the compressor chiller system 300 illustrated in FIG. 3 is connected in the refrigerant loop 302. Therefore, the thermoelectric module 312 is adapted to transfer heat into and/or out of the refrigerant fluid in the refrigerant loop 302.

For example, the thermoelectric module 312 can control a temperature of the refrigerant fluid in the refrigerant loop 302 by transferring heat into the refrigerant fluid to increase the temperature of the refrigerant fluid, and by transferring heat out of the refrigerant fluid to decrease the temperature of the refrigerant fluid (e.g., to provide extra cooling capacity in addition to the compressor 304, etc.).

Although FIG. 2 illustrates one thermoelectric module 212 connected in the coolant loop 210, and FIG. 3 illustrates one thermoelectric module 312 connected in the refrigerant loop 302, other embodiments may include multiple thermoelectric modules in the coolant loop, multiple thermoelectric modules in the refrigerant loop, thermoelectric modules in both the coolant loop and the refrigerant loop, etc.

As disclosed herein, the example controllers may include a microprocessor, microcontroller, integrated circuit, digital signal processor, etc., which may include memory. The controllers may be configured to perform (e.g., operable to perform, etc.) any of the example processes described herein using any suitable hardware and/or software implementation. For example, the controllers may execute computer-executable instructions stored in a memory, may include one or more logic gates, control circuitry, etc.

According to another example embodiment, an exemplary method of operating a compressor chiller system is disclosed. The compressor chiller system generally includes a refrigerant loop having a refrigerant fluid, a compressor connected in the refrigerant loop, a condenser connected in the refrigerant loop, a heat transfer component connected in the refrigerant loop, a coolant loop having a coolant fluid, and a thermoelectric module connected in the coolant loop. The heat transfer component is connected in the coolant loop.

The method generally includes compressing the refrigerant fluid in the refrigerant loop using the compressor, and condensing the compressed refrigerant fluid from the compressor using the condenser. The method also includes transferring heat from the coolant fluid in the coolant loop to the condensed refrigerant fluid from the condenser using the heat transfer component, and transferring heat into and/or out of the coolant fluid using the thermoelectric module.

In some embodiments, the method may include sensing a temperature of the coolant fluid using a temperature sensor, and controlling the thermoelectric module based on sensed coolant fluid temperature. Compressing can include running the compressor substantially continuously. In that case, controlling the thermoelectric module includes controlling the thermoelectric module to maintain the coolant fluid temperature at substantially a set point temperature.

A maximum cooling capacity of the compressor may be less than a maximum cooling demand of the system, and controlling may include controlling the thermoelectric module to provide additional cooling capacity when the cooling demand of the system exceeds the maximum cooling capacity of the compressor.

In some embodiments, the thermoelectric module is a liquid-to-air thermoelectric module coupled to a heat sink. The method may include using a fan to generate an air flow through the condenser and the heat sink coupled to the thermoelectric module. The heat transfer component may include at least one of a heat exchanger and an evaporator.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor chiller system comprising:
   a refrigerant loop having a refrigerant fluid;
   a compressor connected in the refrigerant loop to compress the refrigerant fluid;
   a condenser connected in the refrigerant loop to receive the compressed refrigerant fluid from the compressor and to condense the compressed refrigerant fluid;
   a heat transfer component connected in the refrigerant loop and configured to receive the condensed refrigerant fluid from the condenser;
   a coolant loop having a coolant fluid, the heat transfer component connected in the coolant loop and configured to transfer heat from the coolant fluid to the condensed refrigerant fluid to thereby reduce a temperature of the coolant fluid in the coolant loop; and
   a thermoelectric module connected in the coolant loop, the thermoelectric module adapted to transfer heat into the coolant fluid for increasing the temperature of the coolant fluid and to transfer heat out of the coolant fluid for decreasing the temperature of the coolant fluid, such that the thermoelectric module is operable for controlling the temperature of the coolant fluid in the coolant loop, whereby the thermoelectric module is operable for providing additional cooling capacity when a cooling demand of the compressor chiller system exceeds a maximum cooling capacity of the compressor thereby enabling the compressor to run continuously which reduces compressor turn on and turn off events.

2. The system of claim 1, further comprising:
a temperature sensor coupled to the coolant loop, the temperature sensor adapted to sense a temperature of the coolant fluid; and
a controller coupled between the temperature sensor and the thermoelectric module, the controller configured to receive a sensed coolant fluid temperature from the temperature sensor, and to control the thermoelectric module based on the received coolant fluid temperature;
whereby the controller is operable for controlling the thermoelectric module to transfer heat into the coolant fluid to increase the temperature of the coolant fluid; and
whereby the controller is operable for controlling the thermoelectric module to transfer heat out of the coolant fluid to decrease the temperature of the coolant fluid.

3. The system of claim 2, wherein the compressor is adapted to run continuously, and the controller is configured to control the thermoelectric module to maintain the coolant fluid temperature at a set point temperature by controlling the thermoelectric module to transfer heat into the coolant fluid when the coolant fluid temperature is below the set point temperature and by controlling the thermoelectric module to transfer heat out of the coolant fluid when the coolant fluid temperature is above the set point temperature.

4. The system of claim 3, wherein the controller is configured to control the thermoelectric module to provide additional cooling capacity when a cooling demand of the system exceeds a maximum cooling capacity of the compressor, whereby the compressor is allowed to run continuously and allows for a reduction in a number of compressor turn on and turn off events.

5. The system of claim 1, wherein the thermoelectric module is a liquid-to-air thermoelectric module configured to transfer heat between the coolant fluid and ambient air.

6. The system of claim 1, further comprising:
a heat sink coupled to the thermoelectric module, whereby the heat sink allows for transfer of heat by the thermoelectric module between the coolant fluid and ambient air; and
a liquid block coupled to the thermoelectric module, the liquid block connected in the coolant loop for receiving the coolant fluid internally therethrough, whereby heat is transferable between the thermoelectric module and the coolant fluid via the liquid block as the coolant fluid flows internally through the liquid block.

7. The system of claim 6, further comprising a fan disposed within a same channel, vent, or passageway as the heat sink and the condenser, the fan adapted to generate an air flow through the condenser and through the heat sink coupled to the thermoelectric module, whereby the air flow generated by the fan allows for increased transfer of heat from the heat sink to ambient air and increased transfer of heat from the condenser to ambient air.

8. The system of claim 1, wherein the heat transfer component comprises a heat exchanger configured to receive the condensed refrigerant fluid from the condenser, the heat exchanger connected in the coolant loop and the refrigerant loop and configured to transfer heat between the coolant fluid in the coolant loop and the condensed refrigerant fluid in the refrigerant loop.

9. The system of claim 1, wherein the heat transfer component comprises an evaporator configured to receive the condensed refrigerant fluid from the condenser, the evaporator connected in the coolant loop and the refrigerant loop and configured to transfer heat between the coolant fluid in the coolant loop and the condensed refrigerant fluid in the refrigerant loop.

10. The system of claim 1, further comprising a coolant fluid reservoir connected in the coolant loop for storing coolant fluid as the coolant fluid is cycling through the coolant loop.

11. The system of claim 1, further comprising a heat sink and a liquid block, and wherein the thermoelectric module is a thermoelectric heat pump between the heat sink and the liquid block, whereby the heat sink allows for transfer of heat by the thermoelectric heat pump between the coolant fluid and ambient air, and whereby heat is transferable between the thermoelectric heat pump and the coolant fluid via the liquid block as the coolant fluid flows internally through the liquid block.

12. The system of claim 1, further comprising a pump connected in the coolant loop, the pump adapted to generate a coolant fluid flow through the coolant loop.

13. The system of claim 1, further comprising:
a thermal load component connected in the coolant loop, the thermal load component adapted to transfer heat from the thermal load component to the coolant fluid in the coolant loop to cool the thermal load component; and
a coolant fluid reservoir connected in the coolant loop for storing coolant fluid as the coolant fluid is cycling through the coolant loop.

14. A method of operating a compressor chiller system, the compressor chiller system including a refrigerant loop having a refrigerant fluid, a compressor connected in the refrigerant loop, a condenser connected in the refrigerant loop, a heat transfer component connected in the refrigerant loop, a coolant loop having a coolant fluid, and a thermoelectric module connected in the coolant loop, the heat transfer component connected in the coolant loop, the method comprising:
compressing, by the compressor, the refrigerant fluid in the refrigerant loop;
condensing, by the condenser, the compressed refrigerant fluid from the compressor;
transferring heat, by the heat transfer component, from the coolant fluid in the coolant loop to the condensed refrigerant fluid from the condenser to thereby reduce a temperature of the coolant fluid in the coolant loop; and
controlling the temperature of the coolant fluid in the coolant loop by transferring heat, by the thermoelectric module, into the coolant fluid to increase the temperature of the coolant fluid and by transferring heat, by the thermoelectric module, out of the coolant fluid to decrease the temperature of the coolant fluid, whereby the thermoelectric module is operable for providing additional cooling capacity when a cooling demand of the compressor chiller system exceeds a maximum cooling capacity of the compressor thereby enabling the compressor to run continuously which reduces compressor turn on and turn off events.

15. The method of claim 14, further comprising:
sensing the temperature of the coolant fluid using a temperature sensor; and
controlling the thermoelectric module based on a sensed coolant fluid temperature.

16. The method of claim 15, wherein:
compressing includes running the compressor continuously; and
controlling the thermoelectric module includes controlling the thermoelectric module to maintain the coolant fluid temperature at a set point temperature.

17. The method of claim 15, wherein controlling includes controlling the thermoelectric module to provide additional cooling capacity when a cooling demand of the system exceeds a maximum cooling capacity of the compressor.

18. The method of claim 14, wherein the thermoelectric module is a liquid-to-air thermoelectric module coupled to a heat sink and a liquid block, whereby the heat sink allows for transfer of heat by the liquid-to-air thermoelectric module between the coolant fluid and ambient air, and whereby heat is transferable between the liquid-to-air thermoelectric module and the coolant fluid via the liquid block as the coolant fluid flows internally through the liquid block.

19. The method of claim 18, further comprising generating, by a fan, an air flow through the condenser and the heat sink coupled to the thermoelectric module that allows for increased transfer of heat from the heat sink to ambient air and increased transfer of heat from the condenser to ambient air, wherein the fan is disposed within a same channel, vent, or passageway as the heat sink and the condenser.

20. A compressor chiller system comprising:
a refrigerant loop having a refrigerant fluid;
a compressor connected in the refrigerant loop to compress the refrigerant fluid;
a condenser connected in the refrigerant loop to receive the compressed refrigerant fluid from the compressor and to condense the compressed refrigerant fluid;
a heat transfer component connected in the refrigerant loop and configured to receive the condensed refrigerant fluid from the condenser;
a coolant loop having a coolant fluid, the heat transfer component connected in the coolant loop and configured to transfer heat from the coolant fluid to the condensed refrigerant fluid to thereby reduce a temperature of the coolant fluid in the coolant loop;
a liquid-to-air thermoelectric module connected in the refrigerant loop, the liquid-to-air thermoelectric module adapted to transfer heat into and/or out of the refrigerant fluid;
a heat sink coupled to the liquid-to-air thermoelectric module, whereby the heat sink allows for transfer of heat by the liquid-to-air thermoelectric module between the coolant fluid and ambient air;
a liquid block coupled to the liquid-to-air thermoelectric module, the liquid block connected in the coolant loop for receiving the coolant fluid internally therethrough, whereby heat is transferable between the liquid-to-air thermoelectric module and the coolant fluid via the liquid block as the coolant fluid flows internally through the liquid block;
a thermal load component connected in the coolant loop, the thermal load component adapted to transfer heat from the thermal load component to the coolant fluid in the coolant loop to cool the thermal load component;
a coolant fluid reservoir connected in the coolant loop for storing coolant fluid as the coolant fluid is cycling through the coolant loop;
a temperature sensor coupled to the coolant loop, the temperature sensor adapted to sense a temperature of the coolant fluid; and
a controller coupled between the temperature sensor and the liquid-to-air thermoelectric module, the controller configured to receive a sensed coolant fluid temperature from the temperature sensor, and to control the liquid-to-air thermoelectric module based on the received coolant fluid temperature, whereby the controller is operable for controlling the liquid-to-air thermoelectric module to transfer heat into the coolant fluid to increase the temperature of the coolant, and whereby the controller is operable for controlling the thermoelectric module to transfer heat out of the coolant fluid to decrease the temperature of the coolant fluid;
wherein the compressor is adapted to run continuously, and the controller is configured to control the thermoelectric module to maintain the coolant fluid temperature at a set point temperature by controlling the thermoelectric module to transfer heat into the coolant fluid when the coolant fluid temperature is below the set point temperature and by controlling the thermoelectric module to transfer heat out of the coolant fluid when the coolant fluid temperature is above the set point temperature.

* * * * *